Inventor.
Hermann Haas
by Heard Smith & Tennant.
Attys.

Patented May 25, 1926.

1,585,667

UNITED STATES PATENT OFFICE.

HERMANN HAAS, OF LENNEP, GERMANY.

CLOTH-SHEARING MACHINE.

Application filed June 18, 1925. Serial No. 37,976, and in Germany June 26, 1924.

This invention relates to cloth-shearing machines and particularly to cloth-shearing machines of the type that are provided with two shearing devices, one of which operates on the right side of the cloth and the other of which operates on the wrong side of the cloth.

In prior cloth-shearing machines of this type the knife support of one shearing device is so formed on its rear side that it serves as a cloth guide table for the other shearing device. When the web passes through the machine the shearing device with the reverse-side cloth guide table is raised in such a manner that the cloth recedes from the two shearing cylinders.

One disadvantage of this prior construction is that the two shearing devices are built into each other in a manner which does not allow the operator to properly observe their action and it is, therefore, extremely difficult to tend and operate them in a proper manner.

One of the objects of my present invention is to provide an improved shearing device in which the two shearing cylinders or elements are separated from each other and the cloth guide tables for the two shearing devices are rigidly carried on a common movable support, by the movement of which they are moved toward and from the shearing cylinders.

In order to give an understanding of the invention I have illustrated in the drawings a selected embodiment thereof which will now be described after which the novel features will be pointed out in the appended claims.

$S^1$, $S^2$ indicate two rotary shearing cylinders of usual construction, each co-operating with a stationary shearing blade B. The shearing device $S^1$ is adapted to operate on the under side of a web of cloth G and the shearing device $S^2$ is adapted to operate on the upper side of said web.

Each shearing device has associated therewith a cloth guide table over which the cloth passes and by means of which the cloth is held in position to be acted on by the shearing cylinders. These cloth guide tables are indicated at $T^1$ and $T^2$ respectively and they are rigidly mounted upon a common support H which is herein shown as pivotally mounted at D at a point which is midway between the two tables. The cloth guide table $T^1$ for the shearing device $S^1$ is situated above the web of cloth and the cloth guide table $T^2$ for the shearing device $S^2$ is below the web. The web, therefore, passes between each table and the corresponding shearing device.

A indicates a guide roll over which the web passes and C indicates feed rolls for feeding the web of cloth through the shearing device.

The shape of the support H is such that it is situated at one side of the web, the cloth guide tables $T^1$ and $T^2$ extending laterally from the lever or arm H and lying over and under the cloth. As stated above the support H is pivotally mounted at D and the swinging movement thereof about the pivot carries the cloth guide tables toward and from the shearing devices.

Figure 2:
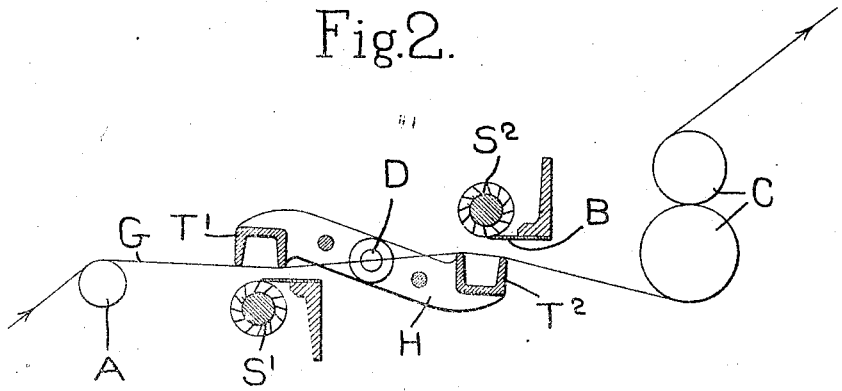
Fig. 2 shows the cloth guide tables moved into inoperative position so as to separate the cloth from the shearing elements.

The shearing device $S^2$ is placed above the shearing device $S^1$ and the guide roll A and feed rolls C are so disposed relative to the shearing devices that when the support H is in the position shown in Fig. 2 the cloth will be separated from the shearing devices and they will, therefore, be inoperative.

Figure 1:
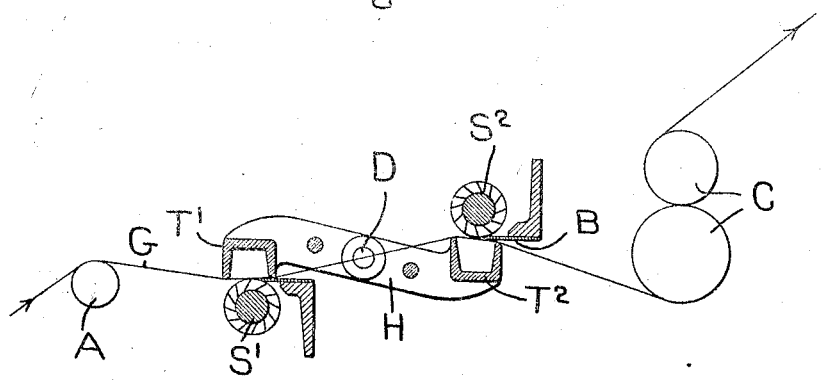
Fig. 1 is a sectional view showing a cloth-shearing machine embodying my invention and illustrating the parts in operative position for shearing both sides of the cloth simultaneously.

To bring the shearing devices into operation the support H is turned about its pivot into the position shown in Fig. 1 and the consequent downward movement of the cloth guide table $T^1$ and upward movement of the cloth guide table $T^2$ carries the cloth into position to be operated on by the shearing devices, the shearing device $S^1$ operating on the under side of the cloth and the shearing device $S^2$ operating on the upper side of the cloth. When it is desired to stop the shearing operation the member H is turned back into the position shown in Fig. 2 thus allowing the cloth to be separated from the shearing devices. The member H may be operated in any suitable way.

I claim.

1. A shearing machine for shearing opposite sides of a web of cloth simultaneously and comprising two shearing knives, characterized in that two cloth guide tables are employed which are separate from the shearing knives and which are mounted on a common movable support, the movement of which in one direction carries each cloth guide table towards its shearing knife and into a position to hold the cloth against the knife, and movement in the other direction carries each cloth guide table away from the corresponding shearing knife.

2. A cloth-shearing machine such as claimed in claim 1, characterized in that the shearing knives are separately supported and in that the two separate cloth guide tables are rigidly carried on a pivoted support.

In testimony whereof, I have signed my name to this specification.

HERMANN HAAS.